United States Patent [19]

Biederstedt et al.

[11] Patent Number: 4,812,004
[45] Date of Patent: Mar. 14, 1989

[54] SPLICE CASSETTE HOUSING

[75] Inventors: Lutz Biederstedt; Dieter Gerke; Claus Sander, all of Berlin, Fed. Rep. of Germany

[73] Assignee: Krone AG, Fed. Rep. of Germany

[21] Appl. No.: 125,494

[22] Filed: Nov. 25, 1987

[30] Foreign Application Priority Data

Nov. 29, 1986 [DE] Fed. Rep. of Germany ....... 3640836

[51] Int. Cl.$^4$ .............................................. G02B 6/36
[52] U.S. Cl. ................................................... 350/96.20
[58] Field of Search .............. 350/96.10, 96.15, 96.16, 350/96.20, 96.21, 96.22, 96.23

[56] References Cited

U.S. PATENT DOCUMENTS

| | | | |
|---|---|---|---|
| 4,359,262 | 11/1982 | Dolan | 350/96.20 |
| 4,373,776 | 2/1983 | Purdy | 350/96.20 |
| 4,500,166 | 2/1985 | Kunze | 350/96.20 |
| 4,702,551 | 10/1987 | Coulombe | 350/96.20 |
| 4,722,585 | 2/1988 | Boyer | 350/96.20 |

FOREIGN PATENT DOCUMENTS

| | | |
|---|---|---|
| 3033928 | 3/1982 | Fed. Rep. of Germany ... 350/96.20 |
| 3236213 | 4/1984 | Fed. Rep. of Germany ... 350/96.23 |
| 3413401 | 10/1985 | Fed. Rep. of Germany ... 350/96.20 |
| 2564989 | 11/1985 | France ............................. 350/96.20 |

Primary Examiner—John D. Lee
Attorney, Agent, or Firm—McGlew & Tuttle

[57] ABSTRACT

A splice cassette housing for optical waveguides has to be brought from an installation position, e.g. a socket-type housing, to a splice position. The incoming and outgoing optical waveguide cables fed with known splice cassette housings along the longitudinal sidewalls are disadvantageous for the free mobility of the splice cassette housing. In order to achieve a high degree of freedom in the mobility of the splice cassette housing, the incoming and outgoing optical waveguide cables 8 and 9 are usually fed separately from each other to the splice cassette housing in a common axis within a flexible hose. Further, a groove-type guide channel 11 in the shape of a member "9" is provided in the bottom 6 of the housing for a change in direction of one of the optical waveguide cables by 180°, in order to be able to feed the individual optical waveguides again from opposed directions to the splice position. The splice cassette housing is suitable for applications especially in cable-terminal boxes, but also in cable distributors and the like for glass-fiber cables.

9 Claims, 2 Drawing Sheets

SPLICE CASSETTE HOUSING

BACKGROUND OF THE INVENTION

Field of the Invention

This invention relates, in general, to optical wave guiding equipment and, in particular to a new and useful splice cassette housing for optical wave guides.

A similar splice cassette housing is known from German Publication No. 3413401. In this housing, the optical waveguide cables are supplied near to the two longitudinal sides of the housing through openings in one front side of the housing. Within the housing, the individual optical waveguide cables of the incoming and outgoing optical waveguide cables are connected to each other over splice positions being borne in a splice bearing. For this, the optical waveguides are placed against the inner faces of the sidewalls. At the sidewalls, devices for holding the optical waveguides down are provided, in the form of tongues projecting inwardly. For repeating a splicing action, for which a reserve length of the individual optical waveguides must be borne in the housing, the splice cassette housing must be brought from an installation position to a splice position. For this, a reserve length of the optical waveguide cables supplied to the housing must also be present.

In the known splicing cassette housing, it is disadvantageous that, due to the incoming and outgoing optical waveguide cables being supplied separately, the mobility of the splice cassette housing is restricted when moving away. Further, there exists a danger, in case of an unsuitable treatment of the splice cassette housing with the supplied optical waveguide cables, that they are damaged mechanically. This may happen, e.g., by not meeting the allowable minimum bending radius.

SUMMARY OF THE INVENTION

The invention provides splice cassette housing which is movable without considerable restriction of the freedom of movement and without the danger of breakage of individual optical waveguides in the optical waveguide cables from an installation position to a splice position and vice versa.

In accordance with the invention, by feeding the incoming and outgoing optical waveguide cables in a common axis, an unrestricted mobility of the splice cassette housing is allowed, which, thus, can be brought easily and without the danger of breakage of individual optical waveguides in the incoming and outgoing optical waveguide cables from the installation position to the splice position and vice versa. In order to achieve, nevertheless, when feeding the optical waveguide cables in a common axis that the free ends of the individual waveguide cables butt against each other for forming splices, i.e. come from different directions, there is further provided, according to the invention, a groove or guide channel in the bottom of the housing. The channel effects a change in the direction of one of the optical waveguide cables by 180° such that even in the distribution of the optical waveguide cables in the individual optical waveguides, an opposed direction of the incoming and outgoing optical waveguides is given.

The groove-type guide channel can be arranged on the inner side of the bottom of the housing or on its outer side, when on the outer side, an opening is formed in the bottom of the housing, for the feeding-through of the optical waveguide cables. In a particular preferred manner, the incoming and outgoing optical waveguide cables fed in a common axis are contained in a flexible hose, in order to guarantee a minimum bending radius.

Further advantageous embodiments of the invention are provided. In particular, reference is made to the advantageous bearing of the individual optical waveguides in plastic pockets.

In total, the following advantages result for the splice cassette housing according to the invention:

When removing the splice cassette housing from an installation position, e.g. a socket-type housing, the incoming and outgoing optical waveguide cables and, thus, their individual optical waveguides or glass fibers, are protected against mechanical damages. This is because the cables are protected, due to the application of the flexible metal hose, which cannot be bent below the minimum bending radius of the glass fibers. Thus, it is safely prevented from falling below the specified minimum bending radius when removing the splice cassette housing.

By separately bearing the individual associated optical waveguides or glass fibers, respectively, and their splices, they can be accurately located and removed from the housing, and it is not difficult at all to remove definitely only one predetermined splice position.

One of the optical waveguide cables, either the incoming or the outgoing cable, is inserted when fed into the housing for a change of the direction into the groove-type guide channel in the shape of a "9" in order to obtain a change of direction by 180°. As in the shape of the guide channel, the minimum bending radiu for the glass fibers is met, no inadmissibly small bending radii will be formed.

Accordingly, it is an object of the invention to provide a splice cassette housing which includes a box-shaped lower part defining a receiving chamber for incoming and outgoing optical wave guide cables and a cover covering said lower part and a housing having an opening accommodating a common axis flexible hose containing a plurality of optical waveguide cables and wherein the bottom wall of the housing has a receiving groove for at least one of the cables which extends through a curved path of substantially 180° in order to provide a change of direction of at least one of the cables which is guided through said groove.

A further object of the invention is to provide a splice cassette housing which is simple in design, rugged in construction and economical to manufacture.

The various features of novelty which characterize the invention are pointed with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

GENERAL DESCRIPTION OF THE PREFERRED EMBODIMENTS

Figure 1:
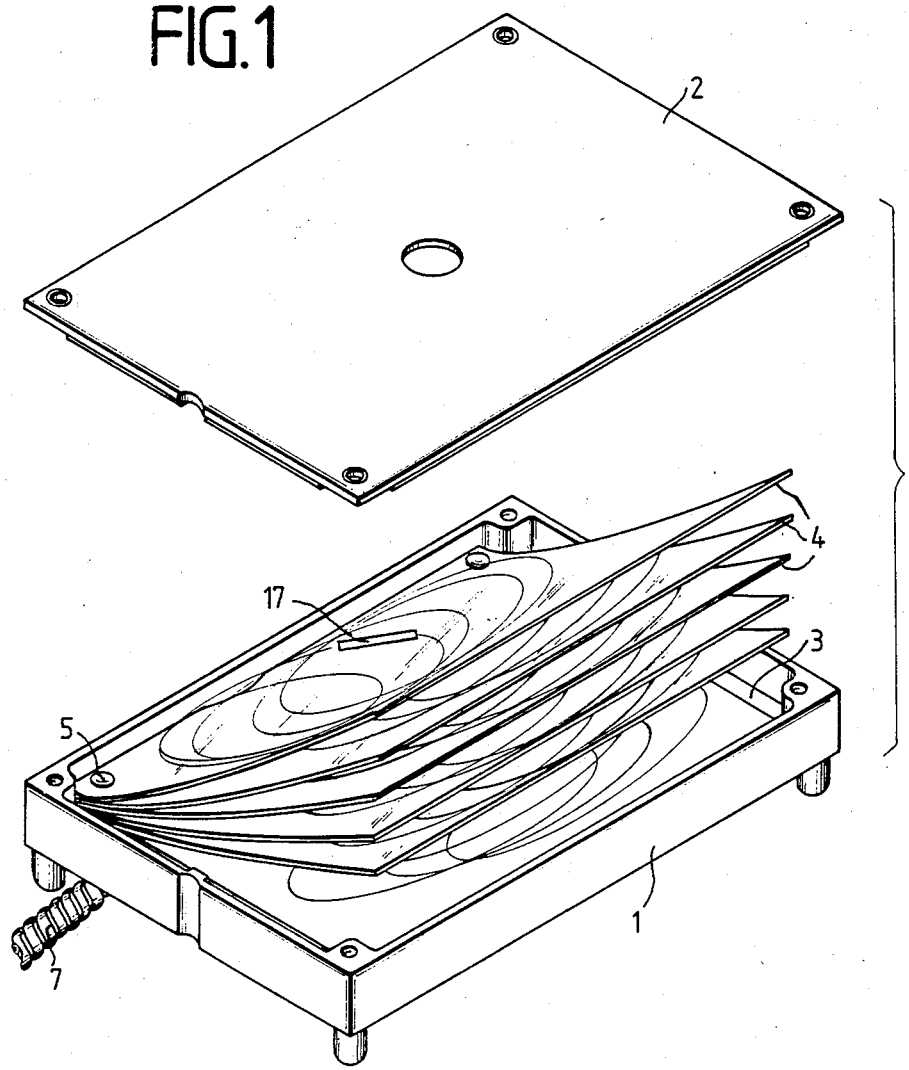
FIG. 1 is a perspective representation of a splice cassette housing with removed cover constructed in accordance with the invention.

Referring to the drawings, in particular, the invention embodied therein comprises a splice cassette housing which includes a box-shaped lower part defining an interior chamber 3 which is closed by a cover 2. In accordance with the invention, the lower part includes an opening for a flexible hose 7 containing a plurality of optical waveguide cables 8 and 9 and it is clamped at the interior of the housing by a clamp 10 over the bottom 6 of the lower part 1 of the housing. With the invention, the bottom 6 is provided with a continuous groove or channel 11 which extends around in a curve to guide one of the cables, such as a cable 12, through the channel 11 so that it changes the direction of the optical waveguide. For this purpose, the channel 11 is made substantially in the shape of the configuration of the numeral 9.

The splice cassette housing for optical waveguides comprises a box-type lower housing part 1 and a housing cover 2 closing the lower part. In the housing compartment 3, six pockets 4 made of plastic are inserted and they are detachably fixed by pressfastener type fixing elements 5 in the housing compartment 3. On the outer side of the housing bottom 6, the incoming and outgoing optical waveguide cables 8 and 9 are led through a flexible hose 7, and the cables are fixed at the bottom 6 of the housing by means of a clamp 10.

Figure 2:
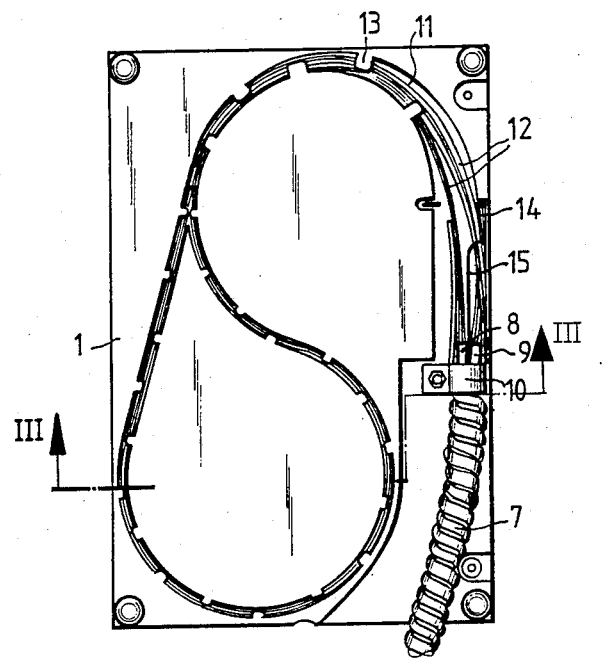
FIG. 2 is a bottom view of the housing shown in FIG. 1.

Along the outer edges of the bottom 6 of the housing, there is a groove or guide channel 11 shaped like a "9", as shown in particular in FIG. 2. The groove or guide channel 11 carries optical waveguides or glass fibers 12. The fibers 12 are spaced from each other and cam-type devices or hold-downs 13 are provided to engage the fibers 12 on both inner sides of the groove-type guide channel 11. The devices 13 protect the optical waveguides 12 against falling out of the guide channel 11. Following a change in direction by 180°, the incoming optical waveguides 12 leave the guide channel 11 again in exactly opposed direction to the optical waveguides or glass fibers 14, respectively, of the outgoing optical waveguide cable 9.

For carrying the optical waveguides 14 of the outgoing optical waveguide cable 9 and the optical waveguides 12 of the incoming optical waveguide cable 8 over, an opening 15 is provided in the bottom 6 of the housing such that the optical waveguide 12 and 14 fed on the underside of the bottom 6 of the housing are carried over into the housing compartment 3.

Figure 3:
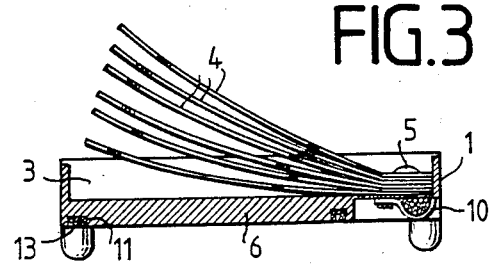
FIG. 3 is a section through the housing taken along the line III—III in FIG. 2.

In the housing compartment 3, the individual, optical waveguides or glass fibers 12 and 14, respectively, are accommodated in one pocket 4 each made of plastic, and are connected to each other by a splice position 1 7. Both longitudinal sides or ends of the pockets 4 are open, however, one longitudinal pocket side can be closed by means of a tongue not shown in detail. By the described arrangement and fixation of the pockets 4 by means of fixing elements 5, the pockets 5 are positioned in the housing compartment 3 to be folded up in a fan-type manner, as shown in FIGS. 1 and 3. The pockets 4 are formed by plastic foils.

The flexible hose 7 connecting the splice cassette housing to, e.g., a socket-type housing, serves for mechanical protection of the incoming and outgoing optical waveguide cables 8 or 9, respectively. The hose 7 comprises a foil, in particular of sheet metal, the sheet metal strips are connected to each other along its side edges in a movable manner by folding. Thus, the hose 7 can only be bent up to a predetermined minimum bending radius being equal to or greater than the allowable minimum bending radius of the optical waveguide cables 8 and 9. The hose 7 can also be made from other materials, particularly plastic. The inner walls must be designed such that the optical waveguide cables 8 and 9 can be fed in and through. The wall thickness could be as small as possible. The hose 7 should be easily flexible above its minimum bending radius.

While specific embodiments of the invention have been shown and described in detail to illustrate the application of the principals of the invention, it will be understood that the invention may be embodied otherwise without departing from such principals.

What is claimed is:

1. A splice cassette housing for optical waveguides, defining a housing compartment having a bottom with an opening for a flexible optical waveguide cable hose and including a groove extending along said bottom defining an optical waveguide receiving channel which extends through a curve within said housing compartment and which extends back upon itself and provides a guide groove for at least one of said optical waveguides which is effected to change the direction thereof by 180°, said optical wave guides having a plurality of separate reserve lengths, and a plurality of pockets in said compartment arranged one above the other and containing respective lengths of said wave guides.

2. A splice cassette housing according to claim 1, wherein said groove for guiding an optical waveguide cable is substantially in the shape of a numeral 9 and is arranged on the bottom of said housing compartment.

3. A splice cassette housing according to claim 1, wherein said compartment is substantially box-shaped and includes side walls, end walls and a top cover, said housing compartment having an opening in said bottom for the passage of said flexible hose, said guide channel being arranged adjacent one of said side walls.

4. A housing according to claim 3, including a flexible hose connected into said compartment, said flexible hose carrying a plurality of said flexible optical waveguide cables and defining a common axis therefor and being of a construction and material so as to define a minimum bending radius.

5. A housing according to claim 4, wherein said reserve lengths provide splicing portions and said pockets providing means in said compartment for arranging said splicing portions one above the other.

6. A splice cassette housing according to claim 5, wherein said pockets are open along a longitudinal side on each side and including a tongue extending over and closing at least one of said sides.

7. A splice cassette housing, according to claim 1, including means for fixing said pockets to at least one side of said compartment leaving the opposite side free, said pockets being arranged in a fan-type manner.

8. A splice cassette housing according to claim 7, wherein said pockets are formed by plastic foils.

9. A splice cassette housing comprising the housing including a box-shaped lower portion defining a compartment having a bottom, side and end walls and a cover closing the top of said lower portion, flexible optical waveguide cable hose holding a plurality of cables extending into one side of said housing and into said compartment, means for clamping said cable hose in said compartment, said compartment having a groove defining a guide channel for at least one optical waveguide cable extending around in a curve on the bottom of said compartment and providing a guide through 180° for said optical waveguide cable and back to said flexible hose, at least one of said optical waveguide cables having a splicing portion and including a plurality of receiving pockets for said splicing portions in said compartment arranged in a stack one above the other.

* * * * *